(12) United States Patent
Wedding et al.

(10) Patent No.: US 6,967,414 B1
(45) Date of Patent: Nov. 22, 2005

(54) POWER LINE ISOLATION

(75) Inventors: Daniel K. Wedding, Toledo, OH (US); Carol A. Wedding, Toledo, OH (US)

(73) Assignee: Imaging Systems Technology, Toledo, OH (US)

( * ) Notice: Subject to any disclaimer, the term of this patent is extended or adjusted under 35 U.S.C. 154(b) by 405 days.

(21) Appl. No.: 10/193,255

(22) Filed: Jul. 12, 2002

Related U.S. Application Data

(60) Provisional application No. 60/308,457, filed on Jul. 30, 2001, provisional application No. 60/308,318, filed on Jul. 30, 2001.

(51) Int. Cl.[7] .............................................. B60L 1/00
(52) U.S. Cl. ....................................... 307/9.1; 307/147
(58) Field of Search ........................ 361/104; 340/10.1, 340/310.01; 307/147, 9.1

(56) References Cited

U.S. PATENT DOCUMENTS

| | | | | |
|---|---|---|---|---|
| 3,842,397 A | * | 10/1974 | Sindle | 367/111 |
| 3,944,981 A | * | 3/1976 | Akita et al. | 340/825.21 |
| 3,975,708 A | * | 8/1976 | Lusk et al. | 340/458 |
| 4,015,232 A | * | 3/1977 | Sindle | 367/111 |
| 4,278,962 A | * | 7/1981 | Lin | 340/904 |
| 4,349,823 A | * | 9/1982 | Tagami et al. | 342/70 |
| 4,626,849 A | * | 12/1986 | Sims | 340/902 |
| 4,714,912 A | * | 12/1987 | Roberts et al. | 340/310.02 |
| 4,801,938 A | * | 1/1989 | Holmes | 342/20 |
| 5,528,217 A | * | 6/1996 | Adams | 340/435 |
| 5,734,357 A | * | 3/1998 | Matsumoto | 345/7 |
| 6,127,939 A | * | 10/2000 | Lesesky et al. | 340/438 |
| 6,140,911 A | * | 10/2000 | Fisher et al. | 340/310.01 |
| 6,254,201 B1 | * | 7/2001 | Lesesky et al. | 303/122.02 |
| 6,282,074 B1 | * | 8/2001 | Anthony | 361/106 |
| 6,522,515 B1 | * | 2/2003 | Whitney | 361/104 |
| 6,545,593 B2 | * | 4/2003 | DeWilde | 340/310.01 |

* cited by examiner

Primary Examiner—Robert L. Deberadines
Assistant Examiner—Brett Squires
(74) Attorney, Agent, or Firm—Donald K. Wedding

(57) ABSTRACT

An electrical system for a vehicle such as a truck wherein a power source is split or divided into a plurality of branch power lines to transmit power and data to a variety of systems and subsystems throughout the vehicle, each line having a fuse and a filter so that the data is isolated on the individual circuits while power is delivered to such circuits. In one embodiment, the system includes a J560 connector with a data filter, data control circuitry, and one or more power line transmitters and receivers being incorporated into the J560.

6 Claims, 11 Drawing Sheets

POWER LINE ISOLATION

I RELATED APPLICATIONS

Priority is claimed under 35 USC 119(e) for Provisional Patent Application No. 60/308,457, filed Jul. 30, 2001 and Provisional Patent Application No. 60/308,318, filed Jul. 30, 2001.

II BACKGROUND

Field of Invention

In a vehicle such as a truck, a single power source, such as a battery, drives a plurality of circuits through a plurality of fuses. In a truck these plurality of circuits are used to power both the tractor and trailer(s). The trailer needs power for marker lights, brake lights, and various other systems. Each one of these branch lines, or circuits, on a trailer is identified by a unique color. The standard configuration is as follows:

| | |
|---|---|
| White | Ground return for all circuits on the towed vehicle |
| Black | Power for the clearance, side marker & license plate lamps |
| Yellow | Power for the left hand turn signal & hazard signal lamps |
| Red | Power for the stopping lamps and anti-lock devices |
| Green | Power for the right hand turn signal & hazard signal lamps |
| Brown | Power for the tail, clearance, side marker, and identification lamps |
| Blue | Power for auxiliary |

One colored line and the white line (or ground return) line make up one circuit, so these seven lines make up six circuits. These six power lines and one ground line originating from the tractor are connected to the trailer through an industry standard SAE J560 (seven pin) connector, Surface Vehicle Standard SAE J560 Specification, Society of Automotive Engineers, Inc., June 1993. The primary purpose of these lines is to deliver power. However, they may also transmit data. An example of this is the anti-lock braking system (ABS).

For purposes of this disclosure, any device or system that transmits and/or receives data over the power lines, singularly or in combination, are herein referred to as Power System Communication Devices (PSCD). Furthermore, PSCD may be factory installed or may be retrofit in an after market installation.

The data transmitted by these PSCD may communicate collision avoidance data, anti-lock braking data, temperatures, tire pressures, and other data to the driver. Currently each PSCD manufacturer uses its own communications protocol, and no single industry standard has emerged.

In professional trucking applications, power system communication is desirable because the existing wire harness may be used and dedicated cables do not have to be routed throughout the vehicle. This is of particular concern if communication is required between systems on the trailer and systems in the tractor. In practice, most tractors are hitched to many different trailers. The standard SAE J560 (seven pin) connector serves to standardize the power connection and thus allows a tractor to be paired with any trailer.

Currently there is no provision for a standard data connection between the tractor and the trailer. It is not desirable to run "rogue" data connections between the tractor and the trailer because tractors and trailers would no longer be universally compatible. Because no standard exists, data connectors might be routed in different physical locations, have different connector types, or even different pin assignments. Therefore, to maintain the universal compatibility between tractors and trailers, it is highly desirable to use the exiting power system for communication.

Power system communication is also desirable in other articulated vehicle applications (such as but not limited too, boats trailers, campers, or car trailers, and other like towing applications) when communication is desired between a lead vehicle and a vehicle in tow. Although universal compatibility is not paramount in these other applications, it is still desirable to eliminate additional wires and connections if at all possible. By using the power bus for communication, the elimination of extra wires is achieved.

Because all of the circuits in a truck are ultimately tied together at the battery in the tractor, communications on the power lines is similar to a telephone "party line" where anyone who picks up their receiver will hear the conversations of everyone else who is talking on the receiver. Therefore, the potential exists for a PSCD from one manufacturer to interfere with the operation of another PSCD from a different manufacturer as they both communicate over the power lines. Interference can occur even if the two PSCDs are on different circuits.

This invention comprises a method of isolating the communications on multiple power lines of a tractor from one another without affecting the power transferred to the branch lines, or circuits for the purpose of generating multiple data buses. This will be accomplished though the use of one or more data filters. For purposes of this disclosure, the term "data filter" refers to one or more inductors, resistors, capacitors, transistors, and/or any combination of like parts known in the art with the purpose of filtering the data communications while passing power through it. Furthermore, this invention isolates the data on the tractor from any trailer or trailers that are electrically connected to the tractor while still allowing the power to be transferred to the branch lines, or circuits. Furthermore, this invention isolates the data on each of the trailers that are electrically connected to each other while still allowing the power to be transferred to the branch lines, or circuits.

This invention allows the number of PSCD that can be attached to the tractor and/or trailer(s) to be increased. It prevents interference between multiple PSCDs. It allows for the use of multiple communication protocols among the different PSCDs sharing the power lines. This is done without alteration to the existing tractor's or trailer's wiring and thus adhering to the SAE J560 standard. This invention also adheres to Safety Standard 121 that requires an anti-lock brake communication signal between the tractor and trailer. This invention also relates to the selected isolation of portions of the power lines.

| Related Prior Art: | |
|---|---|
| U.S. Pat. No. | Inventor |
| 3,842,397 | Sindle |
| 3,944,981 | Akita et al |
| 3,975,708 | Lusk et al |
| 4,015,232 | Sindle |
| 4,278,962 | Lin |
| 4,349,823 | Tagami et al |
| 4,626,849 | Sims |
| 4,714,912 | Roberts et al |
| 4,801,938 | Holmes |
| 5,528,217 | Adams |
| 5,734,357 | Matsumoto et al |
| 6,127,939 | Lesesky et al |

III SUMMARY OF THE INVENTION

This invention relates to data isolation on a power system of a truck or like vehicle for the transmitting of power and data over a common electrical system.

In a first embodiment, the truck is comprised of a tractor only, and the individual circuits within the tractor are isolated. This embodiment allows PSCDs to be placed on different circuits in the tractor while preventing interference between PSCDs produced by different manufacturers.

In a second embodiment, the truck is comprised of a tractor and one or more trailers sharing an electrical system for the transmission of power and the transmission of data. As in the case of the first embodiment, this invention isolates the communications on any number of the circuits on tractor. In addition, this second embodiment isolates the communications between the tractor and each of the trailers connected to the tractor. This second embodiment also provides for communications between the isolated circuits on the tractor and the trailer(s) with or without altering the data as it is passed from one isolated data bus to another.

This is beneficial to the industry because it reduces the need for complex software protocols to select individual PSCDs while deselecting other PSCDs and thus increases the amount of useful data that can be transmitted. The invention herein also allows multiple circuits to be used independently and thus increasing the number of PSCDs that can be installed.

IV DESCRIPTION OF THE SEVERAL VIEWS OF THE DRAWINGS

FIG. 1 shows a block diagram of a generic tractor, or like vehicle, connected to a trailer or like vehicle, with two industry-standard J560 connectors and a coil cord. This diagram demonstrates how a single power source is separated into multiple branch lines, or circuits, at the fuse (or circuit breaker) box. It also demonstrates how the communications on any branch line, or circuit, can be transmitted over all other lines, or circuits.

FIG. 2 shows a block diagram of a generic tractor, or like vehicle, connected to a trailer or like vehicle, with two industry standard J560 connectors and a coil cord. FIG. 2 demonstrates how a single power source is separated into multiple branch lines, or circuits, at the fuse box. It illustrates how the introduction of the invention herein, will isolate the data from all other branch lines or circuits and thus increasing the number of usable data lines within the tractor.

FIGS. 3a, 3b, and 3c show a standard fuse in contrast to a fuse that is incorporated with one embodiment of this invention.

Figure 8:
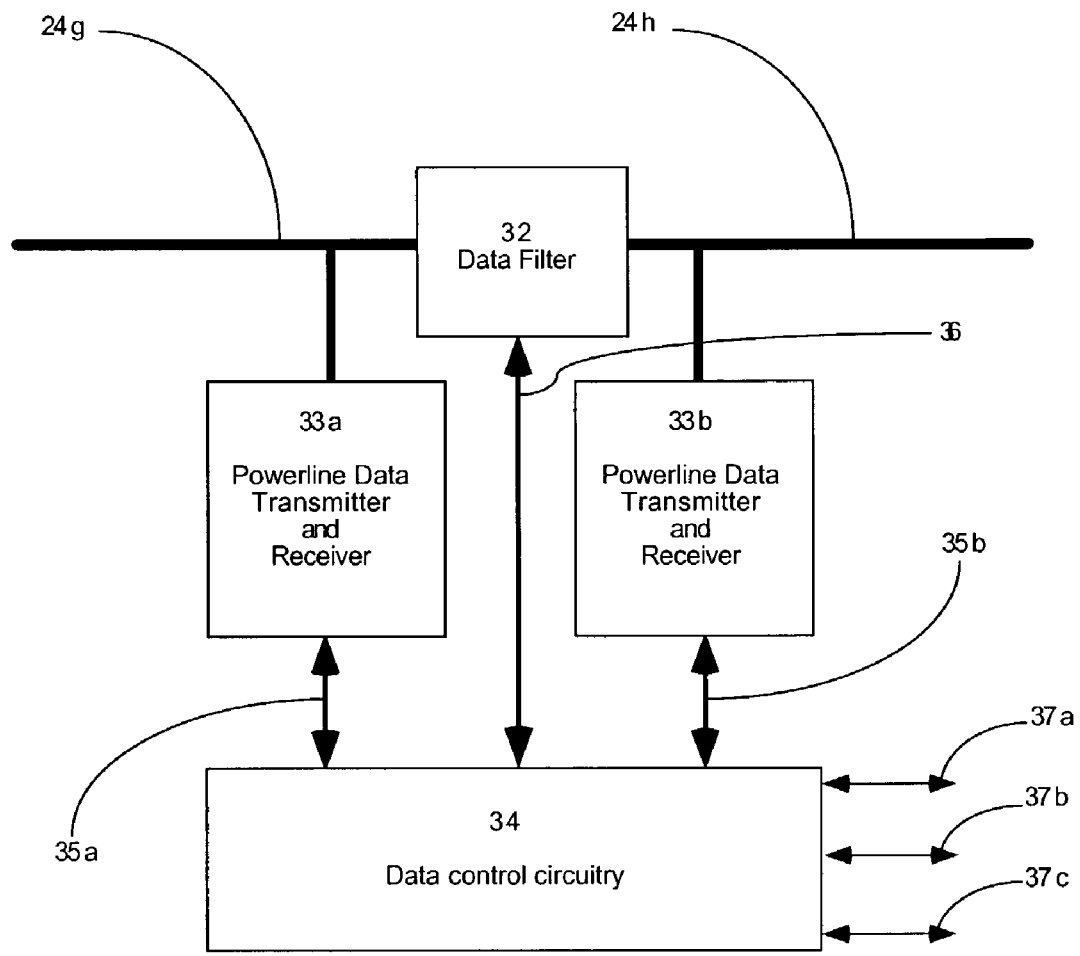
FIG. 8 is a block diagram illustrating another embodiment of this invention.
Figure 9:
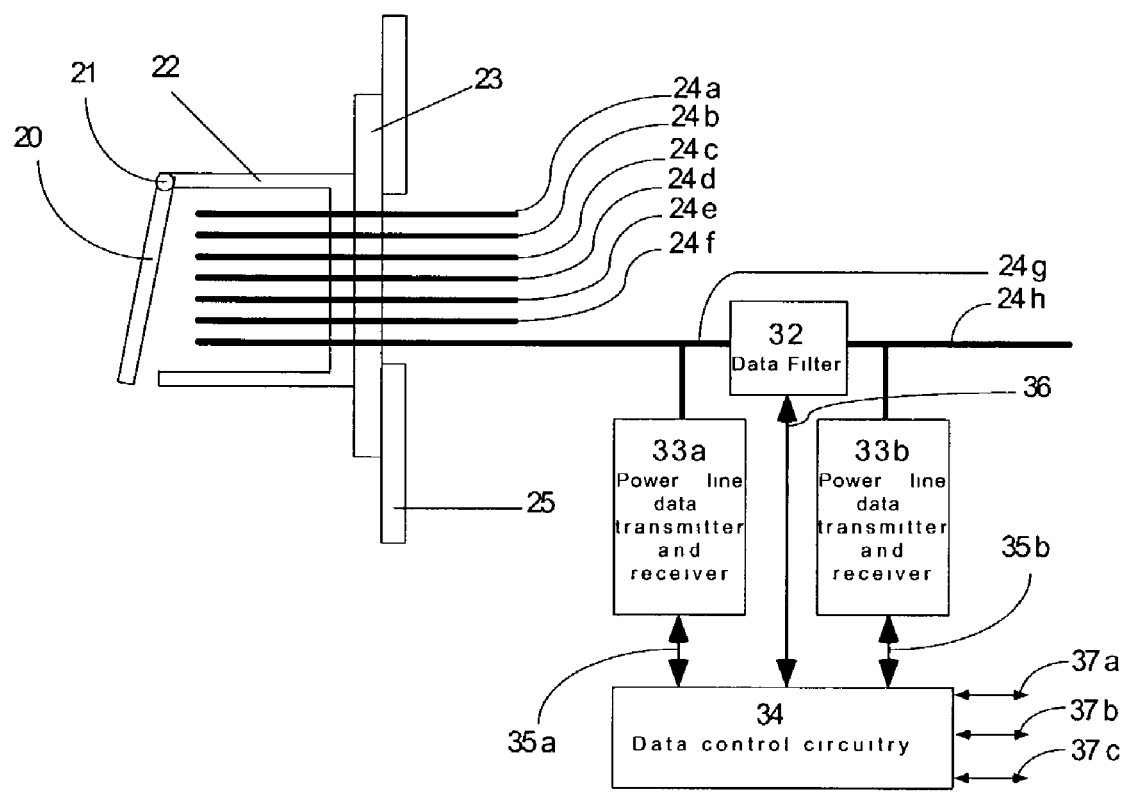

FIG. 9 shows the embodiment of FIG. 8 connected to an industry standard J560 connector. This is referred to herein as a "SMART560". This is only one of many locations in the system that the invention can be inserted. It can also be incorporated into the coil cord, electrical system lines, a device inserted between the cable and J560 connector, or other locations within the electrical system of the truck.

Figure 5:
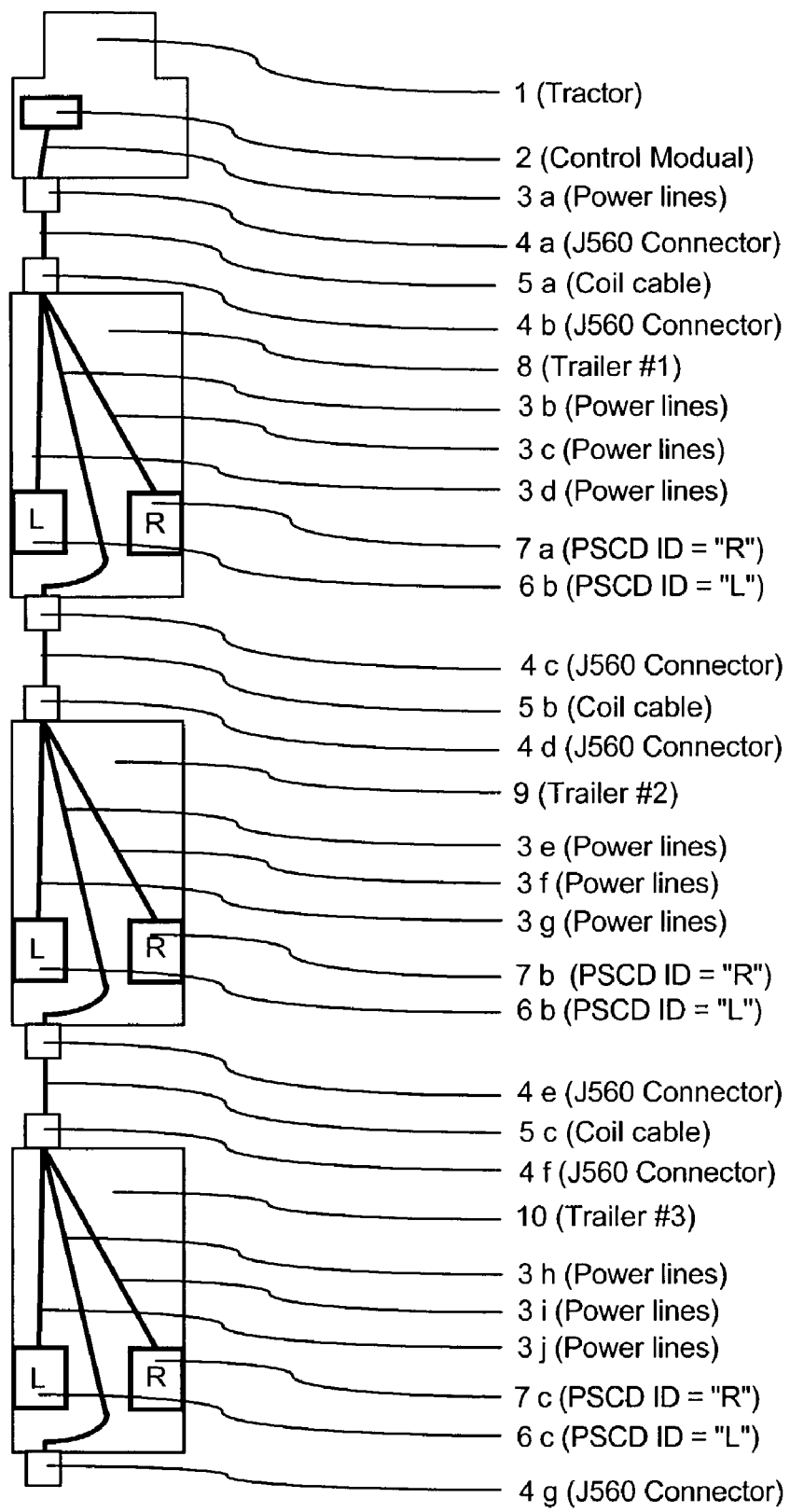
FIG. 5 shows a tractor connected to three trailers using industry standard J560 connectors with a tire pressure sensor system that communicates over the power lines. This illustrates the prior art problem and the need for the invention described herein.
Figure 10:
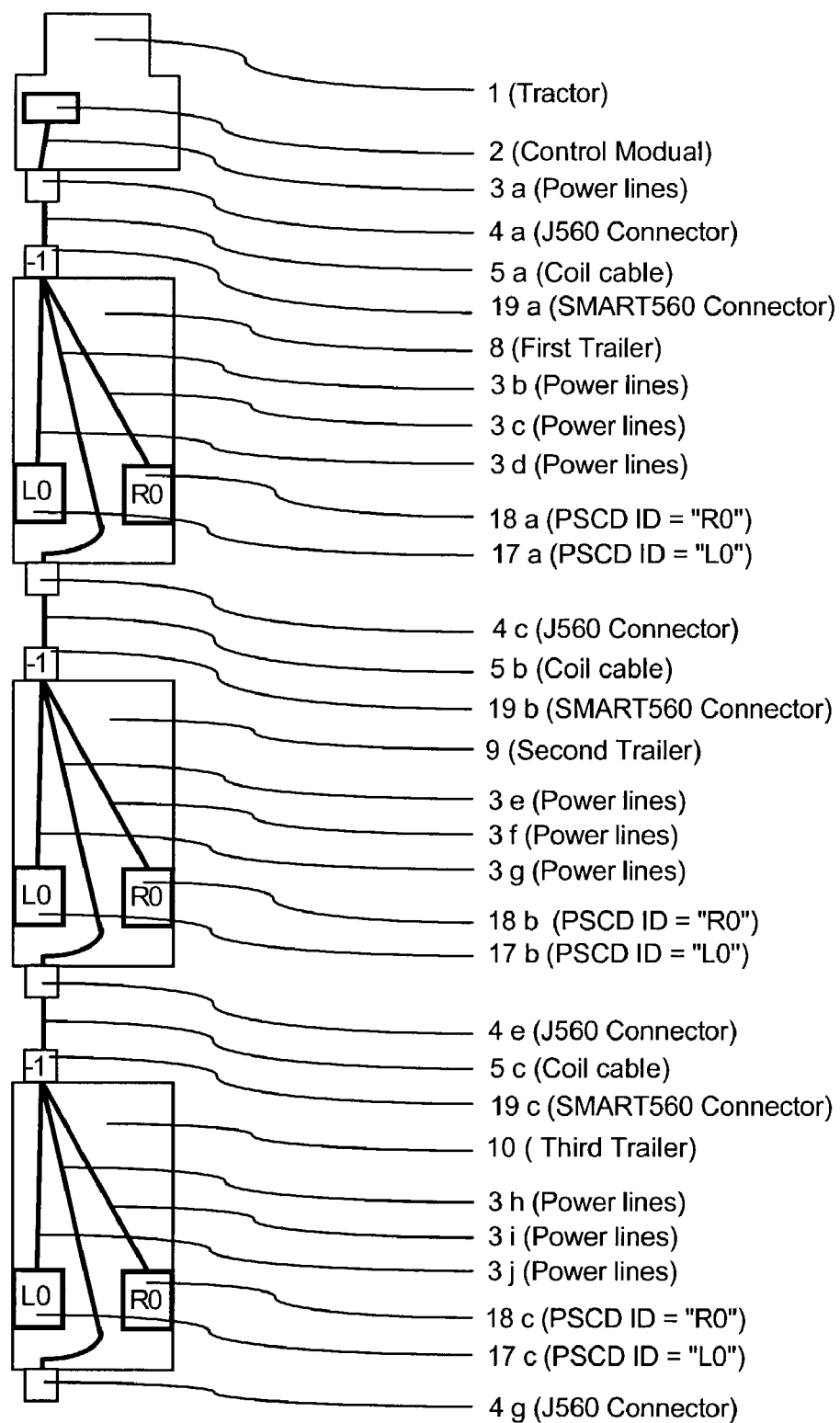

FIG. 10 shows the practice of the embodiment of FIG. 9 to select one of the PSCDs in a series of trailers, thus eliminating the problems described in FIG. 5.

Figure 11:
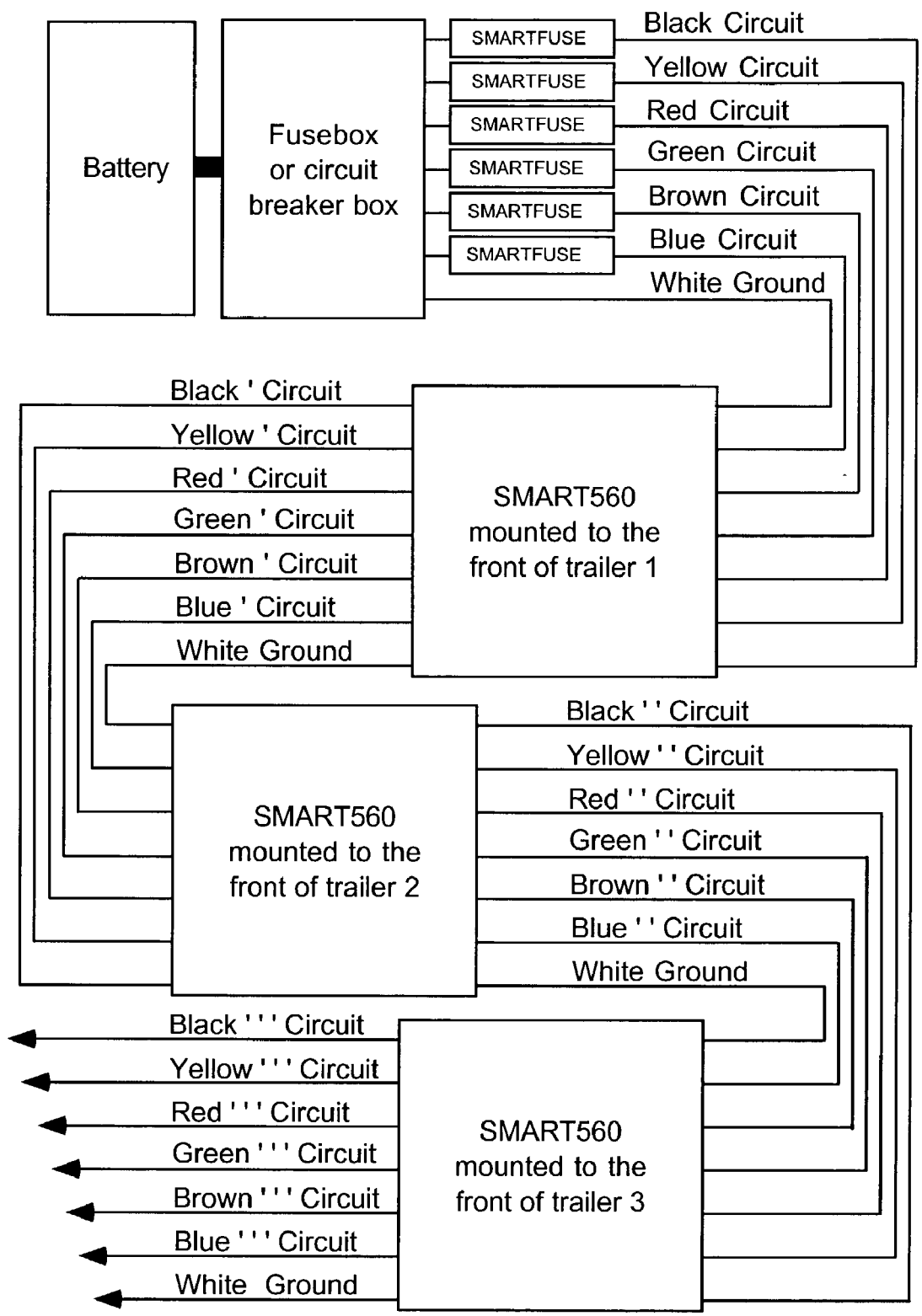

FIG. 11 shows a block diagram of a truck and three trailers and an embodiment to generate 36 unique data buses.

V DETAILED DESCRIPTION

For purposes of this disclosure, the term "fuse" refers to, but is not limited to, slow blow fuses, thermal cutoffs, circuit breakers, automatic switches, and other devices designed to create a break in the circuit it is attached to when one or more predetermined criteria are met. Furthermore, the term "fuse box" refers to any box, housing, or like container that contains one or more fuses.

Figure 1:
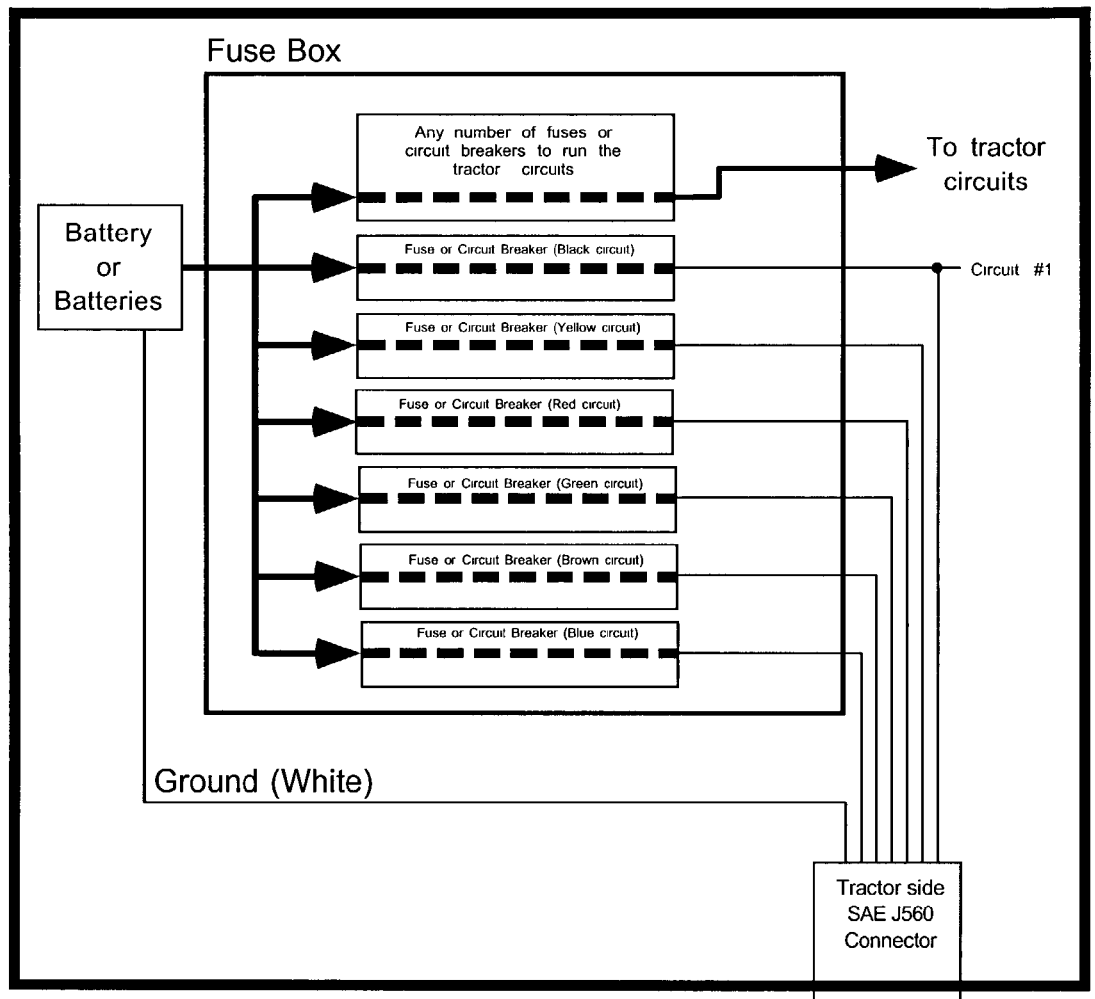
Figure 1:
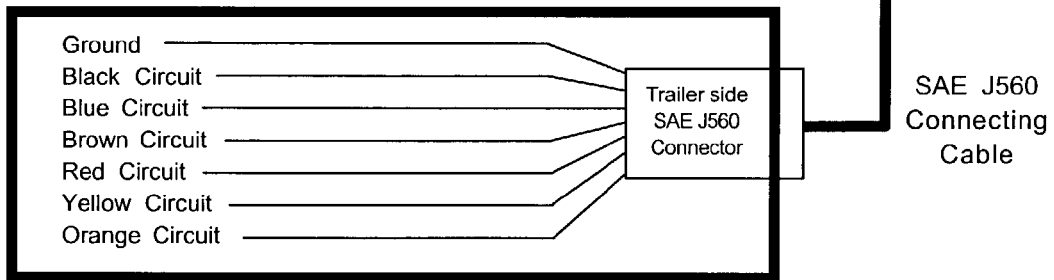

FIG. 1 shows a block diagram of a standard truck connected to a standard trailer using an industry standard SAE J560 connector. In this diagram, a battery on the tractor feeds a fuse box where fuses protect each power line in a tractor. Power lines that are fed to the trailer are done so through an industry standard J560 connection. This connection is made through a standard J560 connector, a flexible cable often referred to as a "coil cable", and a second J560 connector. The J560 standard uses six colored circuits to identify the circuits and a white ground wire to feed power from the tractor to the trailer. If a fuse is not broken, the fuse acts like a direct connection passing both power and power line communications from one side of the fuse box to the other. When a PSCD is attached to any of these six circuits, the data is passed through the fuse protecting the circuit and then back down all of the other circuits on the system. In this FIG. 1, the black circuit is used for communications, and is labeled Circuit 1. The data on Circuit 1 passes through the fuse on the black circuit and is passed down all other circuits (yellow, red, green brown, and blue) in the system. Thus, the data on the black circuit can be detected on any other circuit. The common connection to the battery prevents all of the other circuits from being used independently of each other.

Figure 2:
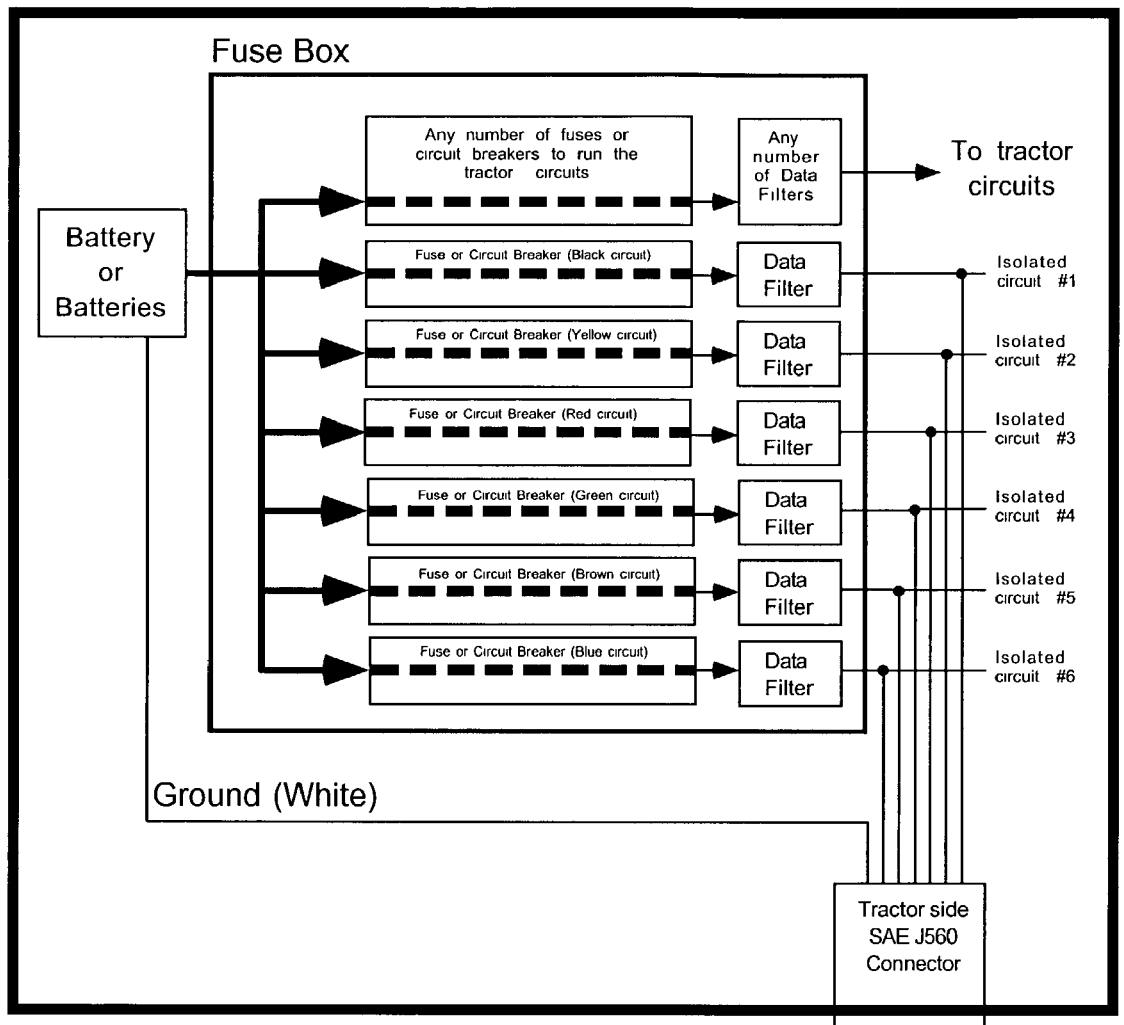
Figure 2:
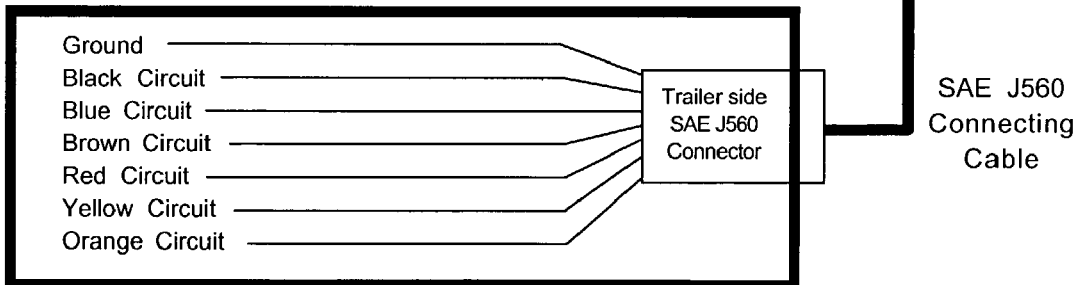

FIG. 2 demonstrates the addition of a data filter in each power line leading to the trailer at the fuse box. This isolates the branch circuits from noise on the system generated by the other circuits in the tractor (i.e., televisions, microwave ovens, radios, etc). This also allows each circuit to act independently and prevents communications on one colored circuit from interfering with the communications on a different colored circuit. This filtration is accomplished while still allowing the power to be passed through unaffected. This isolation of the communications used on the circuits increases the amount of data that can be transmitted within the tractor by more than 600% by increasing the number of useful communication lines from one to six. With fewer devices on each line, the communications protocols can be simplified and further increasing the speed.

FIGS. 3a, 3b, and 3c show a standard fuse and distinct embodiments of how such a data filter can be implemented without alteration to the existing wiring of the tractor or trailer. FIG. 3a shows a standard "spade" fuse for simplicity. This figure should in no way be construed to limit the practice of this invention to this one type of fuse. In a standard fuse a weak spot will break, or "blow", when too much current is drawn by the circuit, thus cutting off its power. When a fuse blows, it helps avoid damage to other parts on the electrical system. These fuses are designed to be removed from a fuse box and replaced after they blow. In this embodiment, a standard fuse is replaced with one possible embodiment of the invention, referred to here as the "SMARTFUSE". After removing the existing fuse, the SMARTFUSE shown in FIG. 3b will plug into the existing fuse box. The SMARTFUSE will act like a standard fuse but will also have a data filter incorporated into it. The SMART-FUSE shown in FIG. 3c will also plug into the fuse holder after the original fuse is removed. However, in this embodiment, the SMARTFUSE does not have a fuse incorporated into it. Instead it has a receptacle that accepts a standard fuse. In both embodiments, the SMARTFUSE does not require any new wiring or re-wiring. The SMARTFUSE that is replacing the existing fuse will be able to break the circuit when too much current is drawn in the same manner as a standard fuse.

Figure 4:
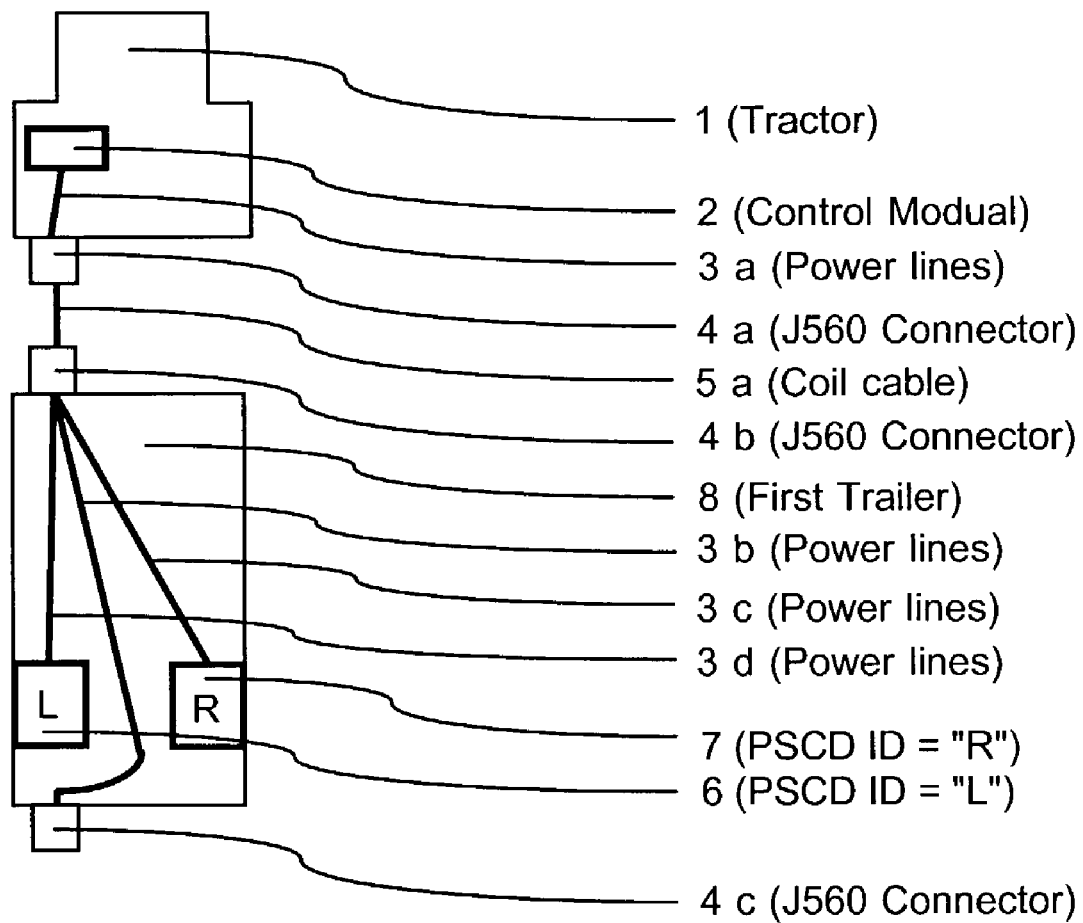
FIG. 4 shows a tractor connected to a trailer using industry-standard J560 connectors with a power system communication device (PSCD) that will report the tire pressure over the power lines.

FIG. 4 is used to illustrate the current technology that is in use by the trucking industry. FIG. 4 shows a standard tractor (1) connected to a first trailer (8) in tow using two industry standard J560 connectors (4 a) and (4 b). The J560 connectors (4 a) and (4 b) are electrically tied together with cable commonly referred to as a "coil cable" (5 a). Trailer (8) has a rear J560 connector (4 c) that is electrically tied or connected to the power lines (3 b) on the trailer (8) and tractor (1). The power lines (3 a–3 d) comprise a single shared or common electrical circuit for transmitting power and data. The other power lines passed to the trailer are not shown here. This J560 (4 c) is installed at the rear of the trailer (8) to allow one or more additional trailers to be connected in tow to the back of trailer (8). In FIG. 4, the tractor (1) is equipped with a control module (2) used to communicate with PSCDs (6) and (7) over the power lines (3 a–3 d). If the vehicle operator wishes to know the pressure of the right rear tire of the trailer (8), a command signal is sent from the control module (2) to the trailer, such as "?PR" representing "Question" "Pressure" "Right" over the power lines (3 a–3 d). This command is sent via the power lines (3 a–3 d) and is received by both tire pressure sensors PSCDs (6) and (7) on trailer (8). Because each of these sensors has a unique ID code, L for the left side sensor (6) and R for the right side sensor (7), only the right PSCD tire pressure sensor (7) will reply. The right side sensor (7) would respond over one of the power lines (3 a –3 d) with its answer, such as "98" representing "98 psi". The pressure control module (2) connected to the same power lines (3 a–3 d) would record and display the information to the vehicle operator (not shown).

FIG. 5 demonstrates a problem encountered by the industry when using the current technology. This figure shows a diagram of a standard tractor (1) connected to three standard trailers (8), (9), and (10) using industry standard J560 connectors (4 a–4 g). The J560 connectors are electrically tied together with "coil cables" (5 a–5 c). In FIG. 5, the tractor is equipped with a control module (2) to determine the PSCD tire pressure monitoring sensors (6 a –6 c) and (7 a–7 c) over the power lines (3 a–3 j). A communications problem occurs if the control module (2) wishes to obtain the pressure on the second trailer (9) on the right side PSCD (7 b). As in the previous example the monitor sends a simple command signal to the trailer, such as "?PR" representing "Question" "Pressure" "Right". This command signal sent via the power lines (3 a–3 j) is received by all three left tire pressure sensors (6 a–6 c) and all three right tire sensor (7 a–7 c). Again, the three left side sensors (6 a–6 c) ignore the command, but the three right side sensors (7 a–7 c) try to respond at the same time. This will cause the response data being sent back to the monitoring device (2) to be corrupted.

Figure 6:
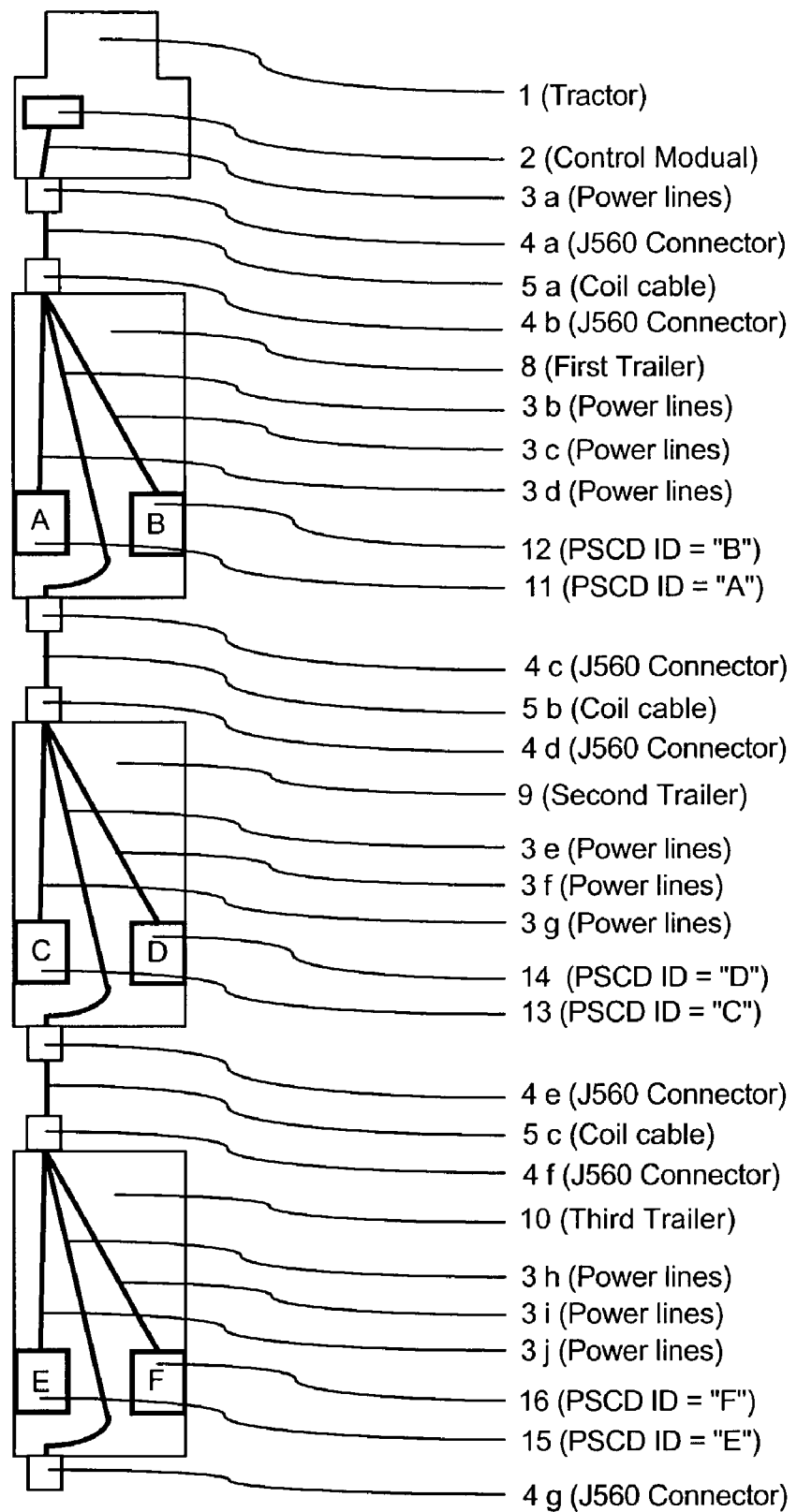
FIG. 6 shows an embodiment to avoid conflict and/or interference between competing data on common or shared electrical circuits for multiple trailers by the reprogramming of all of the sensors on all of the trailers.

FIG. 6 shows a simple method to avoid conflict between the PSCDs on multiple trailers. To avoid conflict and corruption of data, as shown in FIG. 5, each sensor is given its own unique identification (ID) code. In this example, the PSCD tire sensors (11), (12), (13), (14), (15), and (16) are respectively assigned ID values of A–F. If the control module (2) desires to know the tire pressure measured by sensor (14), the device (2) issues the command signal "?PD". Although this embodiment will work, it presents new problems that prevent its practical implementation. In order for this method to work, the trailers must always be connected in the same order and great care must be taken to avoid two trailers with the same series of ID codes programmed into their PSCDs from being placed on the same tractor. When a broken sensor is replaced, it must be replaced with a new sensor with the same ID code. This will be impractical for large trucking fleets because tractors are continuously connected and disconnected from the trailers. It would be very difficult to keep track of the all of the PSCD ID's for all of the systems on all of the trailers in their fleet. The added time and expense for this method will prevent its practical implementation.

A variation on this solution would have the PSCD's ID codes reprogrammed each time a trailer is connected and/or reconnected to a tractor. However, this solution would require added tools and manpower to reprogram each sensor every time the trailers are disconnected and/or reconnected. This would also add delay and expense that large trucking fleets would not tolerate. This also poses the problem of potential legal liability, for example if a worker forgot to reprogram the PSCD's ID and this resulted in an accident.

Figure 7:
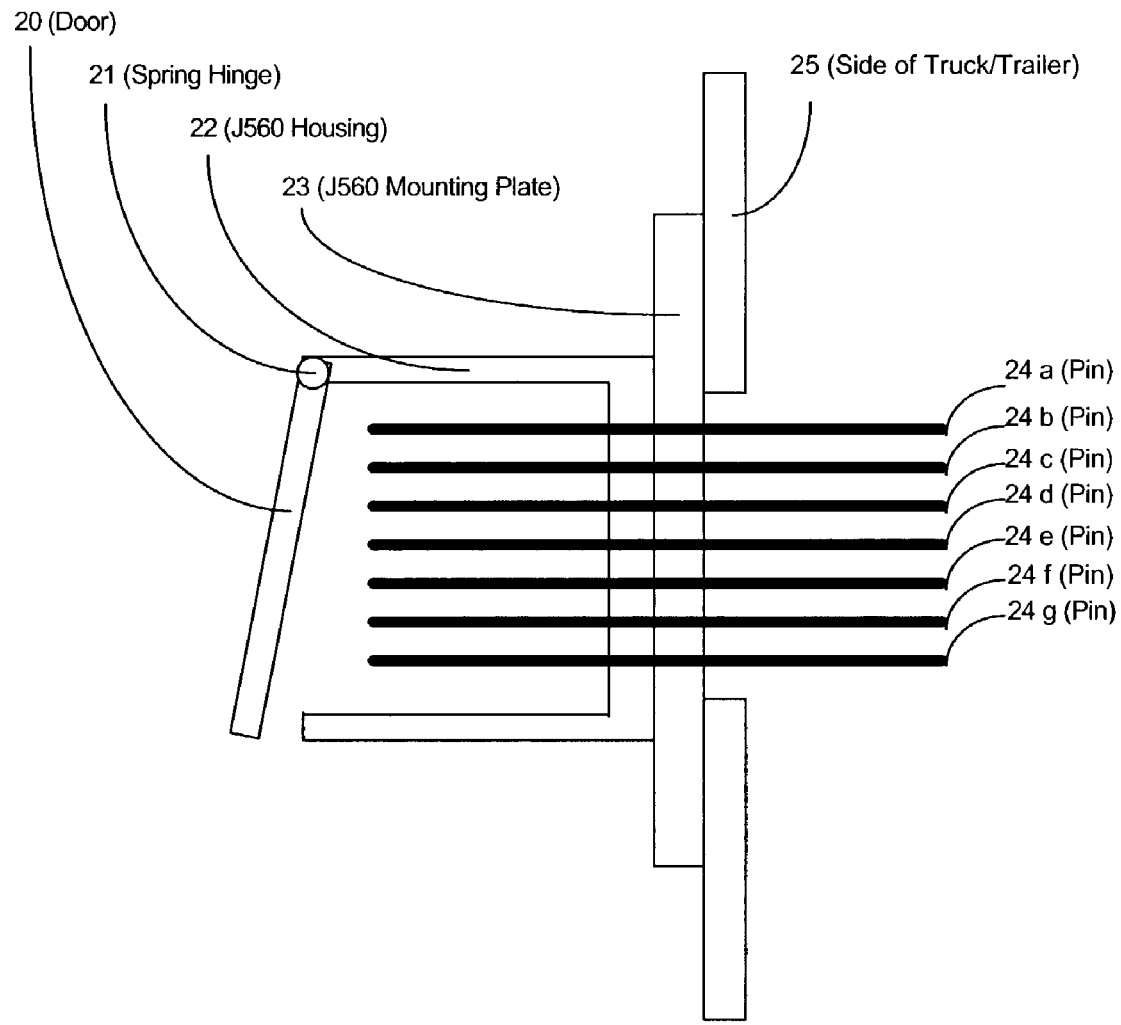
FIG. 7 shows a cross-section of an industry standard J560 connector.

FIG. 7 shows a standard J560 connector (4) that would normally be attached to the back of a tractor and to the front and back of a trailer. This demonstrates how both power and data are passed directly through the connector (4). When not in use, the J560 typically has a door (20) connected to the housing (22) by a spring loaded hinge (21) that forces the door closed when not in use. This door (20) prevents contaminants from getting inside of the connector. The housing (22) is connected to a mounting plate (23) that is used to bolt to the side of the vehicle (25), such as a tractor or trailer. Seven connecting pins made up of six power pins and one ground pin (24 a through 24 g) pass through the housing (22), mounting plate (23), and the side of the vehicle (25). Electrical connections (not shown) are typically made from inside the vehicle to the pins (24 a through 24 g). Power is fed to the J560 by a "coil cord" (5 a) as show in FIG. 4.

FIG. 8 shows a block diagram of one embodiment of the second component this invention. The selection of a trailer is done by inserting this embodiment of the invention in series with the power line that is being used to transmit the data. The power and data are transmitted to the PSCD on one of the six power lines, such as (24 g). The data filter (32) on this line will allow the power to pass through it or block the power from passing through it depending on the state of the filter. The state of said filter is determined by a command that is sent to it by the bi-directional data bus (36). Data is blocked from passing through the data filter at all times. The data on the power line (24 g) is received and decoded by the power line data receiver and transmitter (33 a) and passed through a bi-directional data bus (35 a) to the data control circuitry (34). The data control circuitry (34) may take the form of a microprocessor, resistors, transistors, inductors, logic gates, and/or any other component known in the art. The purpose of this data control circuitry (34) is to evaluate the data and determine if it should alter, change, and/or combine none, some, or all of the data before it is passed on or blocked. If the data is passed on, the control circuitry (34) may pass the data down any number of bi-directional or mono-directional buses. Data may be passed down any number of bi-directional buses shown here as (37 a–37 c) to one or more embodiments of this invention. The data may also be sent down the bi-directional data bus (35 b) to a second power line data transmitter and receiver (33 b). Data sent to (33 b) is then put out on the power line (24 h) that is receiving power from power line (24 g) through the data filter and power filter (32), if this filter is in the state to pass power. This data filter and power filter can be made of discrete components such as, but not limited to inductors, resistors, relays, capacitors, and/or any other like components alone or in combination known in the art. This data filter and power filter will effectively have a single power line (24 g and 24 h) that the power perceives as one continuous circuit that also has the ability to block the power from passing through the power filter.

The data perceives this filter as two isolated circuits and all data must be passed through the data control circuitry (34).

FIG. 9 shows another embodiment of this invention. In this embodiment, the J560 connector (4) attached to the front of the trailer in FIG. 7 is connected to, and combined with, the block diagram of FIG. 8 to create a further embodiment and practice of the second component of this invention (referred to hereafter as the "SMART560"). In this J560 connector (4), the power is passed through the J560 connector via power line (24 g) to the trailer. Once the data and power are inside of the J560, the power and data are passed through the invention as described in FIG. 8. The newly altered data and power are then passed to the PSCDs on the trailer. In this FIG. 8 only one of the pins of the J560 (24 g) has the second component of the invention incorporated on it, but the embodiment as described in FIG. 8 could be inserted on any number of the pins (24 a through 24 g) of the J560. It is contemplated in the practice of this invention that the block diagram in FIG. 9 can be inserted in a number of places throughout the shared or common electrical system. For example, the invention as shown in FIG. 8 can be mounted directly into the coil cable (5) instead of the J560 (4). In the best embodiment, the invention is incorporated into the J560 connector (4) but not limited to the J560 connector.

FIG. 10 shows one preferred embodiment for the practice of this invention. In this example the same tractor and trailer train as in FIG. 5 is equipped with both components of this invention. The tractor is equipped with the "SMARTFUSE" (not shown) and the trailers are equipped with the "SMART560" (19 a–19 c) on the front of trailers (8), (9), and (10) instead of standard SAE J560 connectors (4 b), (4 d), and (4 f). These SMART560 connectors (19 a–19 c) are programed to subtract 1 from the last byte of information in a four ASCII byte packet. In this embodiment all of the left side tire pressure sensors (6 a–6 c) have ID codes of L0 and the right side tire pressure sensors (7 a–7 c) have ID codes R0. Because all of the trailers have the same ID codes, the trailers do not need to be placed in a special sequence for this embodiment to work. There is also no need to reprogram the PSCD sensors every time the trucks are connected. In this example, if the control module (2) for the tire pressure monitoring device is to receive the pressure of the right tire of the second trailer, it must send a command signal to the sensor (7 b) so it will take a reading and respond. The monitor (2) will send the command signal to the first trailer, such as "?PR2" representing "Question" "Pressure" "Right" "2nd trailer". This command is sent via the power line (3 a), to the J560 connector (4 a), to the coil cord (5 a) and finally is received by the SMART560 (19 a) mounted on the first trailer (8). The SMART560 (19 a) intercepts the command and alters it to "?PR1" (subtracting one from the fourth ASCII byte of data). The first trailer's (8) PSCD sensors (6 a) and (7 a) receive the command "?PR1". The sensors on this trailer (8) do not respond because there is no sensors on the first trailer (8) that has the ID code "R1". The command "?PR1" is passed to the second trailer (9) through the power line (3 b), through the J560 connector (4 c), through the coil cord (5 b), and finally to the second SMART560 connector (19 b). The second SMART560 (19 b) subtracts one from the fourth ASCII byte of the command converting the it from "?PR1" to "?PR0". The second trailer's (9) sensors (6 b) and (7 b) receive the "?PR0" command. The last two ASCII bytes of data are in this command are "R0" and they match the ID code for the right side sensor (7 b) of the second trailer (9). The second trailer's (9) right side sensor (7 b) responds to the command with its answer, such as "98" representing a tire pressure of "98 psi" that would be passed forward to the trailer without any of the SMART560 connectors (19 a and 19 b) altering any of the data. For completeness, it should be noted that the command signal "?PR0" will be passed on to the third trailer (10) through, power line (3 e), to J560 connector (4 e), through coil cord (5 c) to the third SMART560 connector (19 c) that will alter the forth ASCII byte of the command, thus converting the command "?PR0" to "?PR/" and pass it to the third trailer (10). The third trailer would also not respond because the last two ASCII bytes of data of the command "R/" do not match any PSCD sensor IDs on this trailer.

In one embodiment presently contemplated for the practice of this invention, the system shown in FIG. 8 is attached to the power lines and incorporated into a standard J560 connector as shown in FIG. 7. By incorporating the second component of this invention into the J560 connector, the invention cannot be separated from the trailer (or vehicle in tow) as might happen if the invention is incorporated into the "coil cord". This invention would be programmed with a set of commands that the data control circuitry would execute when called out by a the command module. A sample of one possible command set is:

| Command | Action |
|---------|--------|
| '?' | (Question) Pass first 3 bytes, −1 from fourth byte |
| 'G' | (Global) Global command, pass all bytes unaltered |
| 'A' | (Answer) Answer a question, pass all bytes unaltered and information is meant for the control module and no other component on the power system. |
| 'B' | (Block) Do not pass the data on. |
| 'R' | (Reprogram) Reprogram ID numbers of the PSCDs that are on this trailer. |
| 'P' | (Block Power) Block power from passing through SMART560 |
| 'p' | (Connect Power) Pass power through SMART560 |
| 'S' | (SMART ID ON) Enable SMART560 ID numbers for applications that require the SMART560 to have an ID code |

-continued

| Command | Action |
| --- | --- |
| 's' | (SMART ID OFF) Disable SMART560 ID numbers for applications that do not require the SMART560 to have an ID code. |
| 'D' | (DEFAULT 560) Restore factory default settings of SMART560. |
| 'd' | (DEFAULT PSCD) Restore factory default settings of all PSCDs. |
| '1' | (Priority) Highest priority, save commands that are currently on the system and pass this command first. When this priority command is finished, resume communications where they were interrupted. |

It should be noted that this embodiment is one of many that can be used to implement and practice this invention and other methods may be employed to achieve similar results. These other methods are within the scope of this invention and include connecting and disconnecting the power to the trailers in a manner prescribed by the SMART560 or commands sent to the SMART560 from the control module. The SMART560 and control module working independently or in conjunction may reprogram the sensor ID codes on the trailer it is controlling. All of these methods still require the SMART560 to block the data transmissions and/or power.

Figure 3:
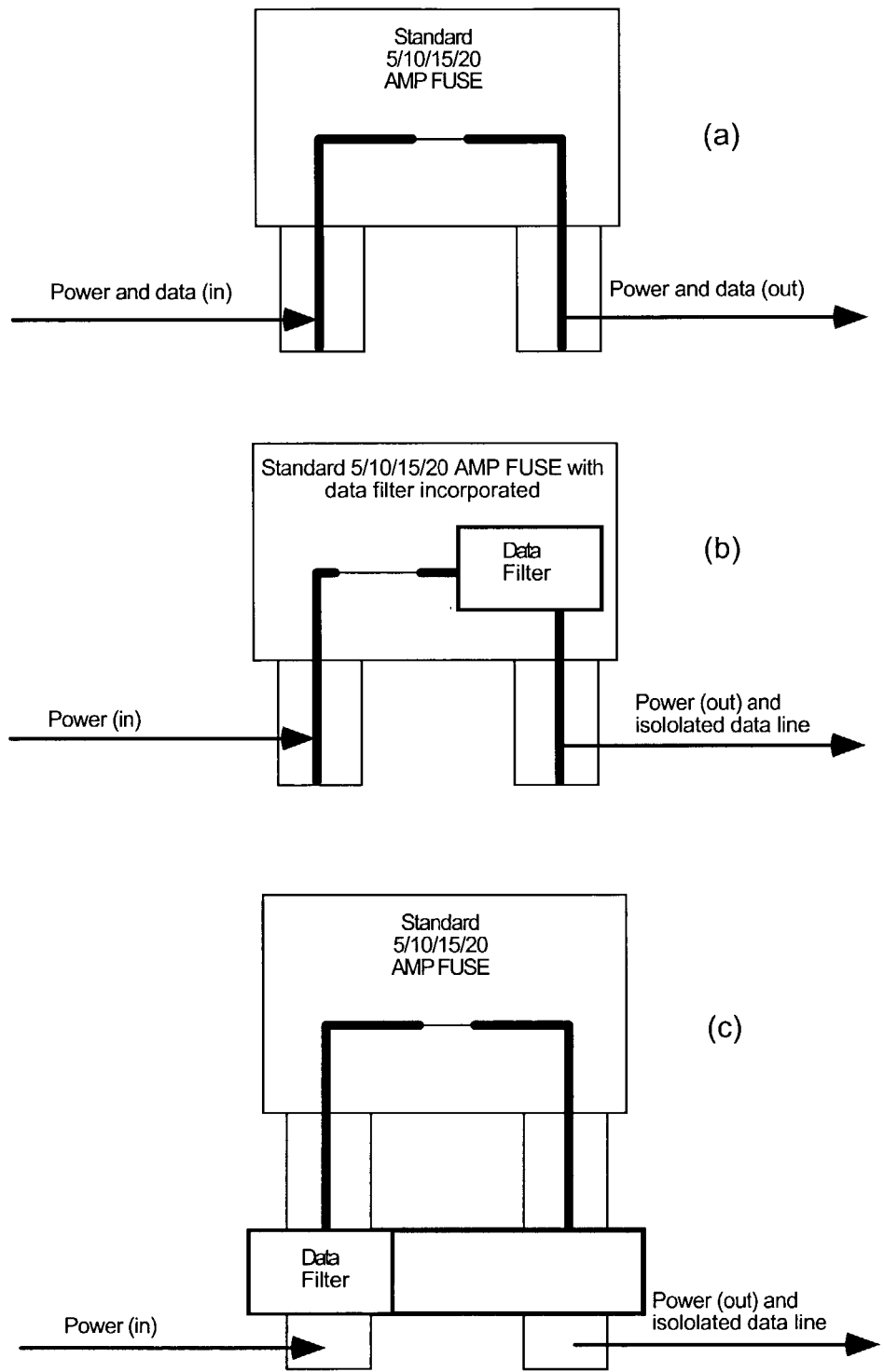

FIG. 11 shows a block diagram of a tractor and three trailers utilizing the combined embodiments of FIGS. 3 and 9. The tractor is equipped with a series of SMARTFUSES as to isolate the data on the colored power lines that will be passed to the trailers in tow. These isolated data power lines in the trailer are referred to as the Black Circuit, Yellow Circuit, Red Circuit, Green Circuit, Brown Circuit, Blue Circuit and the White ground. Once these isolated data circuits pass through the first SMART560, they are further isolated from each other. The Black circuit's data is isolated from the Black' Circuit, the Yellow Circuit's data is isolated from the Yellow' Circuit, and so on. This converts 6 isolated data buses into 12 isolated buses. This set of isolated buses is indicated by a prime (') next to each of the colors. The SMART560 has the ability to bridge the isolated circuits together in order to transmit or alter and then transmit data from one isolated data bus to another. The process is repeated when the data is passed through another SMART560 on the front of the second trailer, thus increasing the number of isolated buses to 18. This set of isolated buses is indicated by a double prime ('') next to each of the colors. The process is repeated when the data is passed through yet another SMART560 on the front of the third trailer, thus increasing the number of isolated buses to 24. This set of isolated buses is indicated by a triple prime (''') next to each of the colors.

What is claimed is:

1. In an electrical system for a truck or like vehicle, wherein a power source is split into a plurality of branch power lines to transmit power to a variety of systems and/or subsystems in the vehicle, the improvement which comprises:
   at least one line containing at least one filter in a fuse box to isolate communications that are transmitted over said line while not blocking the transmission of power over the same said line;
   said electrical system having at least one J560 connector; and wherein a data filter, data control circuitry, and one or more power line data transmitters and receivers are incorporated into the J560 connector.

2. The invention of claim 1 wherein each line has at least one fuse and wherein a filter is incorporated into at least one fuse.

3. The invention of claim 2 wherein said filter is a data filter.

4. The invention of claim 1 wherein said filter is plugged into the fuse box.

5. The invention of claim 4 wherein said filter has a receptacle that accepts a fuse.

6. The invention of claim 5 wherein the fuse is a standard fuse.

* * * * *